United States Patent [19]
Hirabayashi et al.

[11] Patent Number: 5,909,356
[45] Date of Patent: Jun. 1, 1999

[54] SOLID STATE ELECTRIC DOUBLE LAYER CAPACITOR

[75] Inventors: Yukiko Hirabayashi; Satoshi Maruyama; Hisashi Suzuki; Tsuneo Kuwahara; Kazuhide Ohe, all of Chiba, Japan

[73] Assignee: TDK Corporation, Tokyo, Japan

[21] Appl. No.: 08/928,725

[22] Filed: Sep. 12, 1997

[30] Foreign Application Priority Data

Sep. 13, 1996 [JP] Japan .................................. 8-265549
Jun. 25, 1997 [JP] Japan .................................. 9-184389

[51] Int. Cl.⁶ ..................................................... H01G 9/00
[52] U.S. Cl. ........................... 361/523; 361/525; 429/192
[58] Field of Search .................................. 361/502–506, 361/508, 512, 523–526, 528, 532; 252/62.6, 62.9; 429/190, 192, 144, 162, 217, 247–249

[56] References Cited

U.S. PATENT DOCUMENTS 5,296,318  3/1994  Gozdz et al. ........................... 429/192
5,418,091  5/1995  Gozdz et al. ........................... 429/252
5,460,904  10/1995 Gozdz et al. ........................... 429/192
5,571,634  11/1996 Gozdz et al. ........................... 429/192

FOREIGN PATENT DOCUMENTS 6-275469  9/1994  Japan .
6-302472  10/1994 Japan .

OTHER PUBLICATIONS

M. Ishikawa, et al.; Electric Double Layer Capacitors With New Gel Electrolytes; Apr. 6, 1995; pp. 2217–2222.

*Primary Examiner*—Kristine Kincaid
*Assistant Examiner*—Anthony Dinkins
*Attorney, Agent, or Firm*—Oblon, Spivak, McClelland, Maier & Neustadt, P.C.

[57] ABSTRACT

The invention provides a solid type electric double-layer capacitor of the organic solvent system. A solid type electric double-layer capacitor including an electrolyte containing an electrolytic solution in a matrix of a fluorinated polymer prevents liquid leakage and a self-discharge phenomenon and shows performance comparable to prior art capacitors of the organic solvent system.

5 Claims, No Drawings

SOLID STATE ELECTRIC DOUBLE LAYER CAPACITOR

BACKGROUND OF THE INVENTION

1. Field of the Invention

This invention relates to an electric double-layer capacitor having high capacitance and more particularly, to a solid type or solid state electric double-layer capacitor using a gel-like solid as the electrolyte material.

2. Background Art

Electric double-layer capacitors utilizing an electric double-layer, which are small-size high capacitance capacitors, are widely used as backup and auxiliary power supplies for personal computers, information communications equipment such as mobile phones, and electric appliances.

In terms of the type of electrolytic solution, the electric double-layer capacitors currently used in practice are generally classified into an aqueous solution system and a an organic solvent system. Of these, electrolytic solutions of propylene carbonate are generally used as a component of the organic solvent system. One typical capacitor is a coin-shaped cell in which the electrodes utilize activated carbon, activated carbon fibers or the like.

Such coin-shaped capacitors are liable to leakage of the electrolytic solution because of their structure, and suffer from the problem that the electrolytic solution leaked causes the corrosion of capacitor electrodes and internal equipment.

As a performance problem, the coin-shaped capacitors also suffer from self-discharge.

JP-A 302472/1994 discloses an electric double-layer capacitor using a gel-like solid polymer electrolyte. It is disclosed that poly(methyl methacrylate) (PMMA), poly(ethylene oxide), poly(propylene oxide), and poly(vinylidene fluoride) (PVDF) are used as the gel polymeric matrix. However, only PMMA is used in Examples while their capacitance is low. Examples using PVDF are disclosed nowhere. There is no description indicating what type of PVDF is useful or whether PVDF provides a capacitance comparable to PMMA.

JP-A 275469/1994 and Electrochimica Acta, vol. 40, Nos. 13–14, 2217–2222, M. Ishikawa, M. Ihara, M. Morita, Y. Matsuda disclose a capacitor comprising an electrolyte in the form of a gel using polyacrylonitrile (PAN) or poly(ethylene oxide)-grafted poly(methyl methacrylate) (PEO-PMMA) as a polymeric matrix. This capacitor, however, has a capacitance which is about ¼ to about ⅕ of the capacitance of organic solvent electrolyte systems.

SUMMARY OF THE INVENTION

An object of the present invention is to provide an electric double-layer capacitor which prevents liquid leakage and a self-discharge phenomenon and exerts performance comparable to prior art organic solvent systems.

Making a study on various polymeric matrices in consideration of the foregoing problems, we have found that PVDF exhibits superior properties as a polymer matrix of an electrolytic in an electric double-layer capacitor to PMMA and PAN. The above object is achievable by the present invention which is defined below.

(1) A solid type electric double-layer capacitor of the organic solvent system comprising an electrolyte containing an electrolytic solution in a matrix of a fluorinated polymer.

(2) The solid type electric double-layer capacitor of (1) wherein said fluorinated polymer is a homopolymer or copolymer of vinylidene fluoride.

(3) The solid type electric double-layer capacitor of (1) or (2) wherein said copolymer is a copolymer of vinylidene fluoride with hexafluoropropylene wherein the proportion of hexafluoropropylene is 3 to 30% by weight.

One example using PVDF as a gel electrolyte is described in U.S. Pat. No. 5,296,318, which relates to a rechargeable lithium battery cell and does not disclose or refer to the electric double-layer capacitor.

DESCRIPTION OF THE PREFERRED EMBODIMENTS

The solid electrolyte used in the electric double-layer capacitor of the invention is preferably selected from fluorinated polymers, for example, poly(vinylidene fluoride) (PVDF), vinylidene fluoride-hexafluoropropylene copolymers, vinylidene fluoride-hexafluoropropylene fluoro-rubber, vinylidene fluoride-tetrafluoroethylene-hexafluoropropylene fluoro-rubber, and vinylidene fluoride-tetrafluoroethylene-perfluoroalkyl vinyl ether fluoro-rubber. These vinylidene fluoride (VDF) base polymers should preferably contain at least 70% by weight, especially at least 75% by weight of vinylidene fluoride (VDF). Of these, a vinylidene fluoride homopolymer and a copolymer of vinylidene fluoride (PVDF) with hexafluoropropylene (HFP) are preferred. Further preferred are those PVDF copolymers wherein the proportion of hexafluoropropylene is up to 30% by weight, more preferably 3 to 30% by weight, further preferably 3 to 25% by weight, especially 3 to 18% by weight. Since crystallinity lowers as a result of copolymerization, copolymers are readily impregnated with and easily retain an electrolytic solution.

With respect to the correlation between a polymeric matrix material and the performance of an electric double-layer capacitor, adequate conditions exist in the relationship of a salt used in forming a gel to the polymeric matrix although it is not taught in the known references. Accordingly, for a particular VDF base polymer used, for example, the use of a salt and an electrolytic solution well matching with the VDF base polymer provides a high capacitance as compared with electric double-layer capacitors using prior art polymeric electrolytes. There is available an electric double-layer capacitor which despite the solid electrolyte, exhibits a capacitance equivalent to the solution system.

The solvent of the electrolytic solution used herein is preferably a chemically stable non-aqueous solvent. The electrolytic solution used herein is not particularly limited, and any of well-known non-aqueous solvent base electrolytic solutions may be used. Preferred examples of the non-aqueous solvent of the electrolytic solution include propylene carbonate, ethylene carbonate, γ-butyrolactone, acetonitrile, dimethylformamide, 1,2-dimethoxyethane, and sulfolane, with the propylene carbonate being especially preferred. The amount of the non-aqueous solvent used is such that the weight ratio of the non-aqueous solvent to the fluorinated polymer may range from 0.2/1 to 8/1. The solvent contains an electrolyte salt. Preferred examples of the electrolyte salt include alkali metal salts (e.g., lithium perchlorate), amine salts, tetraalkylammonium salts (e.g., tetraethylammonium perchlorate and tetraethylammonium fluoro borate), and tetraalkylphosphonium salts (exemplary counter anions are perchlorate, hexafluoro phosphate, and tetrafluoroborate ions), with quaternary ammonium salts being especially preferred. The electrolyte salt is preferably dissolved in the non-aqueous solvent in an amount of about 0.5 to about 3.0 mol/l.

To the gel-like solid electrolyte mentioned above, a filler such as silica and alumina may be added in an amount of less than 30% by weight. The electrolyte is generally formed to a thickness of 10 to 500 µm.

In preparing the solid electrolyte, PVDF and an organic electrolytic solution are dissolved in a low-boiling point solvent for gelation. This solution has a concentration of 10 to 80% by weight. The solvent which can be used herein is preferably acetone, methyl ethyl ketone or acetonitrile alone or a mixture thereof, preferably one having a boiling point of up to 100 C., especially 50 to 100 C. The solution is dissolved at room temperature, preferably fully dissolved by heating to a temperature from room temperature to about 100 C., before it is formed into a sheet by a doctor blade technique. The sheet is dried to remove the solvent, obtaining a gel-like solid electrolyte. Alternatively, gelation is followed by impregnation of the electrolytic solution. It is noted that since PAN used in the prior art is not soluble in these solvents, but only in a limited number of high boiling point solvents, PAN is directly dissolved in the electrolytic solution before use for the same purpose. In this procedure, a solid polymer electrolyte is prepared by the step of cooling the solution or volatilizing off the solvent from the solution. Both the steps are difficult to control the composition or film thickness of the solid polymer electrolyte, and the latter step is less productive since the high boiling point solvent must be volatilized off.

Further, although PMMA is soluble in the above-mentioned solvents, it is also well soluble in other solvents, leaving a problem with respect to the strength of its solid polymer electrolyte.

The polarizable electrodes used herein are preferably ones obtained by adding a fluoro-resin, fluoro-rubber or the like as a binder to activated carbon or the like as a conductor material and forming the mixture into sheet-shaped electrodes. The amount of the binder may be about 5 to 15% by weight. Equivalent functions are achievable using activated carbon fibers or the like. A current collector on which an electrode layer may be formed by thermally spraying a metal such as aluminum and nickel to activated carbon fibers or by providing a metal mesh to one surface of an activated carbon conductive layer.

Since the electric double-layer capacitor is constructed using a solid polymeric material as mentioned above, the capacitor exerts performance comparable to prior art organic solvent system capacitors and avoids liquid leakage in that the electrolytic solution is retained within the gel. The self-discharge is reduced as compared with the solution system.

EXAMPLE

Experiments and examples of the present invention are given below by way of illustration.

Experiment 1

There were used a VDF-base polymer, that is, a VDF-HFP copolymer having a VDF/HFP ratio=90/10 wt % (KynarFlex 2801, Elf Atochem) as a polymeric matrix, propylene carbonate (PC) as a plasticizer (non-aqueous solvent), and a salt. That is, 14 g of a 1M $(C_2H5)_4NBF_4/PC$ solution was added to 6 g of PVDF, which was dissolved in 30 g of methyl ethyl ketone as an organic solvent. The solution was coated on a PET film and dried to remove the solvent, obtaining a gel, which was measured for conductivity. The conductivity measurement was carried out in a frequency range of 1 Hz to 50 kHz using a conventional AC impedance meter. The series of experimental steps were carried out in a glove box under an argon atmosphere.

The conductivity was $8 \times 10^{-3}$ S/cm. It is evident from the result that high conductivity is obtainable by using the polymeric matrix, organic solvent, and electrolytic solution in an appropriate mixing region according to the invention.

Experiment 2

There were used a VDF-base polymer, that is, a VDF-HFP copolymer having a VDF/HFP ratio =95/5 wt % (KynarFlex 2850, Elf Atochem) as a polymeric matrix, propylene carbonate (PC) as a plasticizer (non-aqueous solvent), and a salt. That is, 14 g of a 1M $(C_2H_5)_4NBF_4/PC$ solution was added to 6 g of PVDF, which was dissolved in 30 g of methyl ethyl ketone as an organic solvent. The solution was coated on a PET film and dried to remove the solvent, obtaining a gel, which was measured for conductivity. The conductivity measurement was carried out in a frequency range of 1 Hz to 50 kHz using a conventional AC impedance meter. The series of experimental steps were carried out in a glove box under an argon atmosphere.

The conductivity was $7 \times 10^{31}$ S/cm. It is evident from the result that high conductivity is obtainable by using the polymeric matrix, organic solvent, and electrolytic solution in an appropriate mixing region according to the invention.

Experiment 3

There were used a VDF-base polymer, that is, a VDF-HFP copolymer having a VDF/HFP ratio=85/15 wt % (KynarFlex 2750, Elf Atochem) as a polymeric matrix, propylene carbonate (PC) as a plasticizer (non-aqueous solvent), and a salt. That is, 14 g of a 1M $(C_2H_5)_4NBF_4/PC$ solution was added to 6 g of PVDF, which was dissolved in 30 g of methyl ethyl ketone as an organic solvent. The solution was coated on a PET film and dried to remove the solvent, obtaining a gel, which was measured for conductivity. The conductivity measurement was carried out in a frequency range of 1 Hz to 50 kHz using a conventional AC impedance meter. The series of experimental steps were carried out in a glove box under an argon atmosphere.

The conductivity was $6 \times 10^{31}$ S/cm. It is evident from the result that high conductivity is obtainable by using the polymeric matrix, organic solvent, and electrolytic solution in an appropriate mixing region according to the invention.

Experiment 4

There were used a PVDF, that is, a homopolymer (KynarFlex 741, Elf Atochem) as a polymeric matrix, propylene carbonate (PC) as a plasticizer, and a salt. That is, 14 g of a IM $(C_2H_5)_4NBF_4/PC$ solution was added to 6 g of PVDF, which was dissolved in 30 g of methyl ethyl ketone as an organic solvent. In the PVDF-PC solution, $SiO_2$ as a hydrophilic filler was mixed in an amount of 20% by weight for suppressing crystallization. The solution was coated on a PET film and dried to remove the solvent, obtaining a gel, which was measured for conductivity. The conductivity measurement was carried out in a frequency range of 1 Hz to 50 kHz using a conventional AC impedance meter. The series of experimental steps were carried out in a glove box under an argon atmosphere.

The conductivity was $3 \times 10^{31\ 3}$ S/cm. It is evident from the result that high conductivity is obtainable by using the polymeric matrix, organic solvent, and electrolytic solution in an appropriate mixing region according to the invention.

These results are shown in Table 1. It was found that equivalent results were obtained when 1M $(C_2H_5)_4PBF_4/PC$ was used as the salt in Experiments 1 to 4.

TABLE 1

| | Conductivity (S/cm) |
|---|---|
| Experiment 1 | $8 \times 10^{-3}$ |
| Experiment 2 | $7 \times 10^{-3}$ |
| Experiment 3 | $6 \times 10^{-3}$ |
| Experiment 4 | $3 \times 10^{-3}$ |

Example 1

A test cell was fabricated by stacking films which were obtained using a solid electrolyte of Electrolyte Composition 1 shown below and a polarizing electrode prepared under Polarizing Electrode Condition 1 shown below. The cell was charged up to 2 volts and discharged at a constant current of 1 mA to measure the time taken until the terminal voltage (reached) 1 volt. An initial capacitance was calculated therefrom. The result is shown in Table 2.

Electrolyte Composition 1

| | |
|---|---|
| Poly(vinylidene fluoride) (VDF/HFP = 90/10, Mw 380,000, KynarFlex 2801, Elf Atochem) | 6 g |
| MEK (methyl ethyl ketone) | 30 g |
| 1M $(C_2H_5)_4PBF_4$ (tetraethylphosphonium salt)/PC (propylene carbonate) solution | 14 g |

Polarizing Electrode Condition 1

| | |
|---|---|
| Poly(vinylidene fluoride) (VDF/HFP = 90/10, Mw 380,000, KynarFlex 2801, Elf Atochem) | 6 g |
| Activated carbon | 20 g |
| Carbon black | 0.7 g |
| 1M $(C_2H_5)_4NBF_4$ (tetraethylammonium salt)/PC (propylene carbonate) solution | 14 g |
| MEK (methyl ethyl ketone) | 30 g |

Example 2

A test cell was fabricated by stacking films which were obtained using a solid electrolyte of Electrolyte Composition 1 in Example 1 and a polarizing electrode prepared under Polarizing Electrode Condition 2 shown below. The cell was charged up to 2 volts and discharged at a constant current of 1 mA to measure the time taken until the terminal voltage (reached) 1 volt. An initial capacitance was calculated therefrom. The result is shown in Table 2.

Polarizing Electrode Condition 2

| | |
|---|---|
| Poly(vinylidene fluoride) (VDF/HFP = 90/10, Mw 380,000, KynarFlex 2801, Elf Atochem) | 6 g |
| Activated carbon | 20 g |
| Carbon black | 0.7 g |
| 1M $(C_2H_5)_4PBF_4$ (tetraethylphosphonium salt)/PC (propylene carbonate) solution | 14 g |
| MEK (methyl ethyl ketone) | 30 g |

Example 3

A test cell was fabricated by stacking films which were obtained using a solid electrolyte of Electrolyte Composition 1 in Example 1 and a polarizing electrode prepared by thermal spraying aluminum to activated carbon fibers, shaping them to predetermined dimensions, and incorporating a polymeric electrolyte. The cell was charged up to 2 volts and discharged at a constant current of 1 mA to measure the time taken until the terminal voltage (reached) 1 volt. An initial capacitance was calculated therefrom. The result is shown in Table 2. After this cycle, the cell was charged up to 2 volts again, whereupon a current value (leakage current) necessary to maintain the potential was measured to find a fully small value of 20 μA.

Comparative Example 1

A prior art coin-shaped cell using a non-aqueous solvent was measured for capacitance by the same procedure as in Example 1. It is noted that all the cells of Examples 1 to 3 and Comparative Example 1 were of coin-shaped and equal area.

TABLE 2

| | Capacitance (F) |
|---|---|
| Example 1 | 1.5 |
| Example 2 | 1.5 |
| Example 3 | 1.7 |
| Comparative Example 1 | 1.7 |

As is evident from Table 2, the solid type electric double-layer capacitors according to the invention show a substantially equal capacitance to the prior art organic solvent system coin-shaped capacitor. The capacitance of the capacitors according to the invention is greater by a factor of 1.5 to 5 than the examples using PMMA, PAN, and PEO-PNMA described in the known references (JP-A 302472/1994, JP-A 275469/1994 and Electrochimica Acta, vol. 40, Nos. 13–14, 2217–2222, M. Ishikawa, M. Ihara, M. Morita, Y. Matsuda). It is thus evident that the solid type electric double-layer capacitors according to the invention show remarkably improved capacitance.

Comparative Example 2

A test cell was fabricated using a solid electrolyte of Electrolyte Composition 2 shown below and the polarizing electrodes of Example 3. No charge/discharge was possible because of short-circuit between polarizing electrodes.

Electrolyte Composition 2

| | |
|---|---|
| Poly(methyl methacrylate) (Acrypet VH, Mitsubishi Rayon K.K.) | 6 g |
| MEK (methyl ethyl ketone) | 30 g |
| 1M $(C_2H_5)_4NBF_4$ (tetraethylammonium salt)/PC (propylene carbonate) solution | 14 g |

Comparative Example 3

A test cell was fabricated using a solid electrolyte of Electrolyte Composition 3 shown below and the polarizing electrodes of Example 3. Leakage current was measured by the procedure described in Example 3 to find a large value of 150 μA.

Electrolyte Composition 3

| | |
|---|---|
| Poly(methyl methacrylate) (Acrypet VH, Mitsubishi Rayon K.K.) | 12 g |
| MEK (methyl ethyl ketone) | 30 g |
| 1M $(C_2H_5)_4NBF_4$ (tetraethylammonium salt)/PC (propylene carbonate) solution | 12 g |

With respect to the composition of the VDF-base polymer mentioned above, those polymers containing 3 to 30% by weight of HPF can be utilized. Polymers deviating from this range are not practical because they cannot fully retain the electrolytic solution or have extremely low film strength. As also mentioned above, the polymeric matrix is further improved in properties by blending a proper filler therein. Although the electrolytic solution is premixed during preparation of the electrolyte in the above-mentioned examples, it is possible to incorporate the electrolytic solution into a gelled film by using DBP, diglyme, tetraglyme and analogues as the removable plasticizer and then immersing in the electrolytic solution.

BENEFITS

There has been described a solid type electric double-layer capacitor which shows an equal capacitance to the prior art coin-shaped capacitor, eliminates the risk of liquid leakage because of the solid type, and minimizes self-discharge.

In contrast to the solution type, the solid state allows the capacitor to be used as a plastic capacitor having a greater area due to sheeting and a greater degree of configurational freedom due to planar thin lamination.

We claim:

1. A solid type electric double-layer capacitor of the organic solvent system comprising an electrolyte containing an electrolytic solution in a matrix of a fluorinated polymer.

2. The solid type electric double-layer capacitor of claim 1 wherein said fluorinated polymer is a homopolymer or copolymer of vinylidene fluoride.

3. The solid type electric double-layer capacitor of claim 2, wherein said fluorinated polymer is a homopolymer of vinylidene fluoride.

4. The solid type electric double-layer capacitor of claim 2, wherein said fluorinated polymer is a copolymer of vinylidene fluoride.

5. The solid type electric double-layer capacitor of claim 1 wherein said copolymer is a copolymer of vinylidene fluoride with hexafluoropropylene wherein the proportion of hexafluoropropylene is 3 to 30% by weight.

* * * * *

UNITED STATES PATENT AND TRADEMARK OFFICE
CERTIFICATE OF CORRECTION

PATENT NO. : 5,909,356
DATED : June 1, 1999
INVENTOR(S) : Yukiko HIRABAYASHI, et al.

It is certified that error appears in the above-identified patent and that said Letters Patent is hereby corrected as shown below:

On the title page and at the top of Column 1, Item [54], the title, should read:

-- SOLID TYPE ELECTRIC DOUBLE-LAYER CAPACITOR--

Signed and Sealed this

Fourth Day of January, 2000

Attest:

*Attesting Officer*     *Acting Commissioner of Patents and Trademarks*